July 2, 1963
W. HERTELL
3,095,885
DISHWASHER
Filed Feb. 21, 1962
2 Sheets-Sheet 1
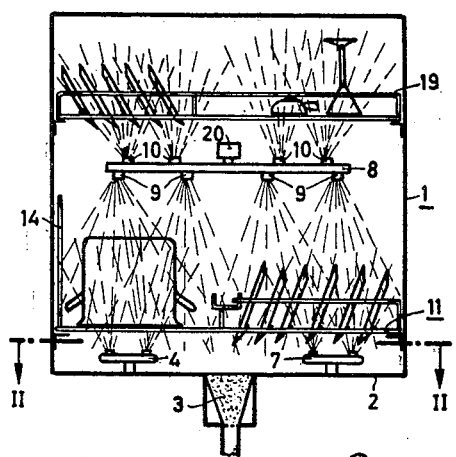
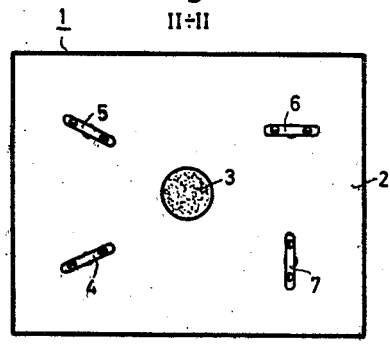
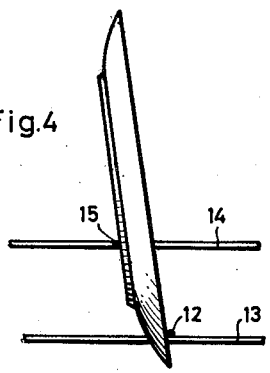
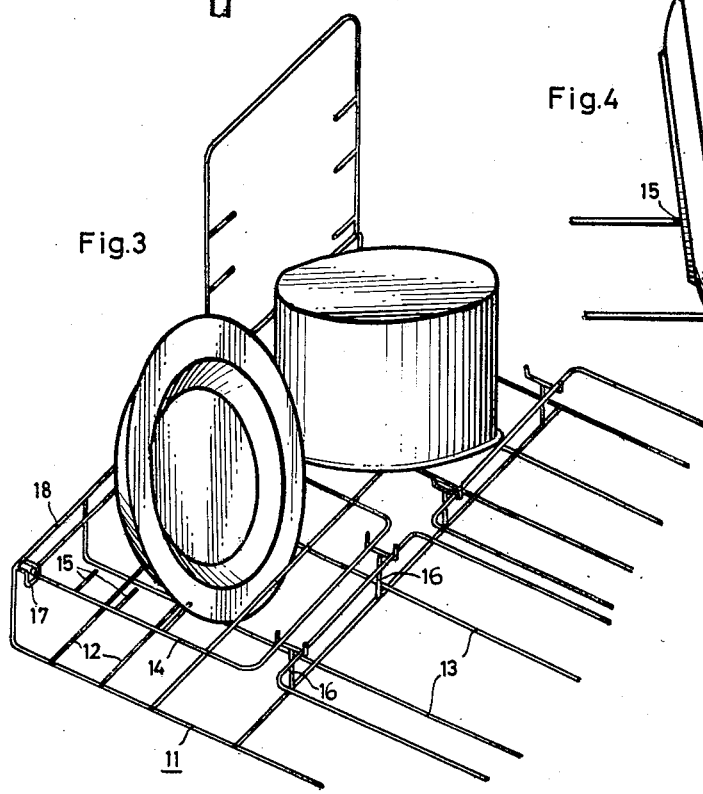

July 2, 1963 W. HERTELL 3,095,885
DISHWASHER
Filed Feb. 21, 1962 2 Sheets-Sheet 2

3,095,885
DISHWASHER
Wilhelm Hertel, Traunreut, Germany, assignor to Siemens-Electrogeräte Aktiengesellschaft, Berlin, Germany, a corporation of Germany
Filed Feb. 21, 1962, Ser. No. 174,781
Claims priority, application Germany, Feb. 22, 1961
8 Claims. (Cl. 134—58)

My invention relates to dishwashing machines, particularly those of the household type.

It is desirable to make such machines equally well applicable for all dishes and utensils used in a household. However, while plates, cups, glasses and the like can readily be washed, the known dishwashers are hardly capable of cleaning cooking utensils, particularly cooking pots coated by burned food.

It is an object of my invention to devise a dishwasher which, aside from washing such articles as china and glassware, also affords a satisfactory cleaning of cooking pots and other vessels or hollow utensils.

To this end, and in accordance with a feature of my invention, the water-jet nozzle units, of which at least one is of the rotating type, comprise upwardly directed nozzle means so mounted that a cooking vessel, such as a pot, can be accommodated there above in upside-down position for having the inner space of the vessel squirted with water from below, whereas other nozzle units are elsewhere in the washer chamber so that at least some of them simultaneously operate to direct jets of cleaning water toward the outer surface of the vessel.

According to another feature of the invention, the dishwasher is provided with control means for controlling the water pressure applied to the nozzles so that at least those nozzles that serve for cleaning the inner space of a cooking utensil or vessel operate at a higher water pressure than the other nozzles of the appliance.

Comprehensive tests have shown that optimal cleaning action without damage to china and glassware is obtained with a water pressure of approximately 1.5 to 2.5 atmospheres (above ambient air pressure) in those nozzles that operate to clean the hollow vessel spaces, whereas the other nozzles preferably operate at the lower pressure heretofore conventional or generally preferred for dishwashers, namely at about 0.5 to 1 atm. To minimize the size of the equipment for producing or controlling the water pressure and securing an optimal effect of the jets issuing from the nozzle systems, at least those nozzle devices that serve for cleaning the interior of cooking vessels and the like are preferably so controlled during washing operation as to operate with periodically variable pressure, for example by being switched on and off in alternate sequence.

The foregoing and other objects, advantages and features of my invention will be apparent from the following description in conjunction with the embodiment illustrated by way of example on the accompanying drawings in which:

FIG. 1 shows schematically a front view of the washing chamber of a dishwasher, the front wall being removed.

FIG. 2 is a view onto the bottom portion of the dishwasher in a section taken along the line II—II in FIG. 1;

FIG. 3 is a perspective view showing a portion of a mounting shelf structure for dishes and utensils;

FIG. 4 shows a portion of FIG. 3 in cross section; and

Figure 5:
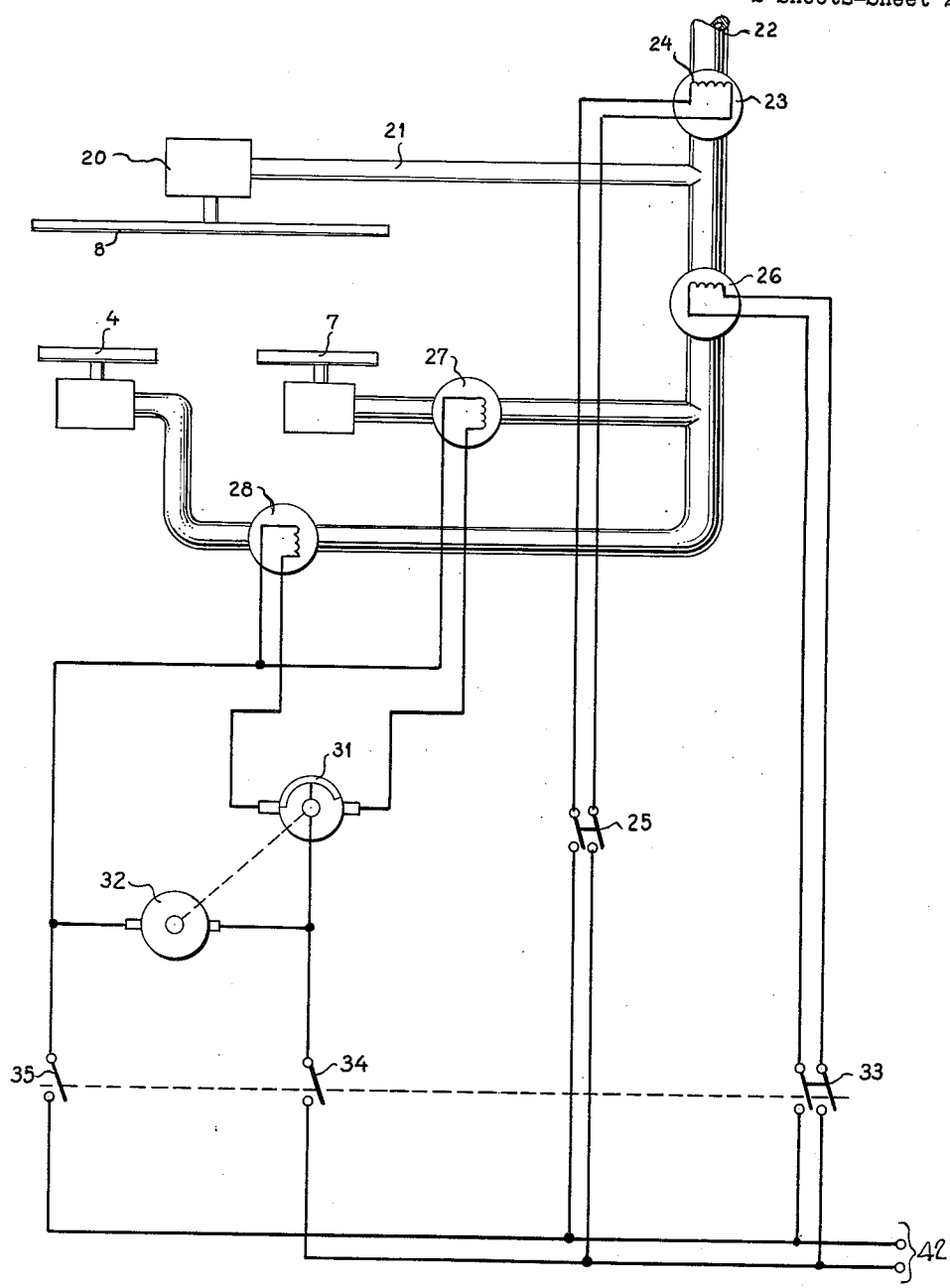
FIG. 5 is a schematic diagram of a water-pressure control system applicable with the dishwasher.

The housing 1 of the dishwasher forms a washing chamber on whose bottom 2 four nozzle units 4, 5, 6 and 7 are arranged preperably in symmetrical distribution.

Each nozzle unit in the illustrated embodiment comprises a small rotatably mounted arm of approximately 10 to 14 cm. length which has upwardly directed, preferably slit-shaped outlet openings at the respective two end portions for issuing jets of water. The arm is placed in rotation by the back pressure of the jet in accordance with Segner's principle. If desired, however, other known nozzle devices are likewise applicable. For example, small centrifugal fan wheels may be used in conjunction with stationary nozzles for flinging the water through the washer chamber. The driving power for the rotating nozzles, instead of being provided by the ejected water itself, may also be supplied by an electric motor.

The nozzle units 4, 5, 6 and 7 mainly serve for cleaning the hollow spaces of pots and other vessels that are placed upside down above these units. According to FIG. 1 for example, a cooking pot is placed over the nozzle unit 4 so that the inner pot space is cleaned by the jets of hot water issuing from the nozzle unit. The outer surface of the pot is impinged upon by water from another nozzle device 8 which is rotatably on a water supply nipple 20. The nozzle device 8 also consists essentially of a rotating arm driven in accordance with Segner's principle. It has outlet openings 9 on its lower side which direct jets of water from above onto the pot and onto other dishes, utensils or implements placed upon the lower lattice shelf 11 of the washer. The nozzle device 8 also has upwardly directed outlet openings 10 for cleaning dishes or other objects placed on an upper rack or lattice shelf 19.

The distribution of the nozzle units 4 to 7 is apparent from FIG. 2. Located in the center of the washer chamber is a drain opening covered by a filter 3 through which the rinsing water passes out of the washer.

Some types of dishwashers make it desirable to provide for means that permit keeping the auxiliaries for controlling the water pressure within convenient size or weight limits. This is the case, for example, when the washer is provided with a pump for circulating the water. For this purpose, only two of the four nozzle units 4 to 7 are preferably connected to the water supply or circulatory system at a time, alternating with the other two units. The same purpose can be served by alternately supplying water under pressure to the nozzle systems 4 to 7 on the one hand and to the nozzle system 8 on the other hand. The alternation may take place 30 to 50 times per minute, but may also be of a higher order of magnitude in which case a particularly effective pulsating action of the water upon fast adhering food residue is secured.

The nozzle systems 4 to 7 preferably operate, particularly when a considerably soiled pot is to be cleaned, with a considerably higher water pressure. For example, this pressure may be about 1.5 to 2 atm. or more.

The lower lattice shelf 11 can be exchanged for a differently constructed shelf or rack when it is to be used only for cleaning normal dinnerware. According to FIGS. 3 and 4, however, the lower shelf is preferably provided with auxiliary devices that permit selectively placing either pots or dishes above each of the individual nozzle systems 4 to 7. The shelf 11 consists essentially of longitudinal rods 13 and transverse rods 12 jointed together to form a frame structure that possesses an upwardly drawn rim 18 with hinges or eyes 17. The eyes serve as pivots for inserts essentially consisting of a frame 14 with pins 15. The inserts serve for placing dinner plates in upright position so that they rest upon the longitudinal rods 13 and are kept in position by the transverse rods 12 and the pins 15 as apparent from FIGS. 3 and 4. The inserts can be turned upwardly about the eyes 17 when not in use, for example when cooking pots are to be cleaned. When thus turned upwardly and in a vertical position, the inserts are displaceable in the eyes 17 toward the longitudinal rods 13 so that they are prevented from dropping back. In their horizontal position of use, the inserts have their frames 14 rest upon abutments 16 located at the same height as the eyes 17. The free ends of the pins 15 can be given such a bent shape that the dishes will lean only against the front surfaces of the angular pin portions. If desired, the inserts for accommodating dinner plates can be made removable, or they can be so pivoted as to permit being swung toward each other or toward the middle of the appliance. Removable individual shelf or rack structures of any desired other design may also be used, for example lattice shelves having vertically upright pins in lieu of the frames 14 and pins 15. By means of such shelf or rack designs the dishwasher can readily be adapted to the particular kind of dinnerware and other utensils or implements to be cleaned simultaneously.

An example of the above-mentioned pressure control means is schematically illustrated by the circuit diagram shown in FIG. 5, in which only some of the nozzle devices, namely those denoted by 4, 7 and 8, are shown. The nozzle device 8 is connected by a pipe 21 with a main pipe 22 for a supply of hot water under pressure under control by a normally closed check valve 23 of the solenoid type whose control coil 24 is connected to a current supply line 42 under control by a normally open electric switch 25 which forms part of the programming controller or timer (not otherwise shown) of the appliance. The main water pipe 22 is further connected through solenoid valves 26, 27 and 28 with the nozzle devices 7 and 4 respectively. The control coils of valves 26, 27 and 28 are also connected to the current supply line 42 under control by a normally open switch 33 and normally open switches 34, 35, which are ganged together with the switch 33 and when closed energize a motor 32 to drive an interrupter 31 that alternately energizes the solenoid coils of valves 27 and 28 to operate each of them intermittently in the above-described rapid sequence. The group of switches 33, 34 and 35 is to be closed manually only when one or more cooking pots or similar utensils are placed into the washer. Ordinarily, however, the switches 33, 34, 35 remain open and both valves 27, 28 are also open. In this case the setting of valve 26 is such that the water pressure at nozzle devices 4 and 7 is substantially the same as the water pressure at nozzle device 8 when the main valve 23 is opened by the programming switch 25. However, when cooking pots are to be cleaned and the switches 33, 34, 35 are closed, the valve 26 is electrically set by its coil to supply a much higher pressure to the nozzle devices 4 and 7, but then only one of the two valves 27 and 28 is open at a time to alternately supply the nozzle devices 4 and 7 with water under high pressure.

To those skilled in the art it will be obvious upon studying this disclosure that my invention permits of various modifications with respect to details and arrangement of components and hence can be given embodiments other than particularly illustrated and described herein, without departing from the essential features of my invention and within the scope of the claims annexed hereto.

I claim:

1. A dishwasher, comprising a housing with a washing chamber, lattice-type shelf structures in said chamber for supporting dishes to be washed, one of said structures being adapted at a given location to accommodate a cooking vessel in upside-down position; a plurality of jet nozzle means mounted in said chamber for squirting water against objects placed onto said structures and comprising upwardly directed nozzle means mounted below said location for directing jets of water into the hollow of a vessel, said plurality also comprising nozzle means disposed between said structures and directed to pass jets of water onto the outer surface of the vessel, at least a portion of said plurality of jet nozzle means being mounted for periodic movement while water is being squirted; pressure conduit means connected to all of said nozzle means for supplying water thereto, and pressure control means interposed in said conduit means ahead of those of said nozzle means that are mounted below said location for controlling said latter nozzle means when washing a vessel to operate at a higher pressure than said other nozzle means.

2. A dishwasher, comprising a housing forming a washing chamber, lattice-type shelf structures in said chamber for supporting dishes to be washed, one of said structures being adapted at a given location to accommodate a cooking vessel placed upside down; a jet nozzle arrangement in said chamber for squirting water against objects placed onto said structures and comprising upwardly directed nozzle means mounted below said location for directing jets of water into the hollow of a vessel, and nozzle means between said structures and directed to pass jets of water onto the outer surface of the vessel, pressure conduit means connected to all of said nozzle means for supplying water thereto, and pressure control means interposed in said conduit means ahead of those of said nozzle means that are mounted below said location for controlling said latter nozzle means when washing a vessel to operate at a higher pressure than said other nozzle means.

3. In a dishwasher according to claim 2, said nozzle means below said location when set by said control means for washing a vessel having a superatmospheric pressure of 1.5 to 2.5 atmospheres, and said other nozzle means having a pressure of about 0.5 to 1.0 atmospheres.

4. A dishwasher, comprising a housing forming a washer chamber, lattice-type shelf structures in said chamber for supporting dishes to be washed, one of said structures being adapted at a given location to accommodate a cooking vessel placed upside down; a jet nozzle arrangement mounted in said chamber for squirting water against objects placed onto said structures and comprising a plurality of upwardly directed nozzle means below said locations for directing jets of water into the hollow of vessels to be washed, and nozzle means between said structures and directed to pass jets of water onto the outer surface of the vessels; said upwardly directed nozzle means being mounted for circular movement; pressure conduit means connected to all of said nozzle means for supplying water thereto, periodically switching valve means between said conduit means and said plurality of upwardly directed nozzle means for alternately operating said latter valve means respectively, and pressure control means interposed in said conduit means ahead of those of said nozzle means that are mounted below said location for controlling said latter nozzle means when washing a vessel to operate at a higher pressure than said other nozzle means.

5. In a dishwasher according to claim 1, said upwardly directed nozzle means comprising at least two separate circularly moving nozzle devices for cleaning the interior of two respective vessels, and said other nozzle means having downwardly directed jet orifices for external cleaning of vessels and upwardly directed jet orifices for cleaning articles on the upper shelf structure.

6. In a dishwasher according to claim 1, said one shelf structure having a rack-member insert movable upon said location and having means for supporting dinnerware instead of a cooking vessel when placed upon said location.

7. In a dishwasher according to claim 1, said one shelf structure having a rack-member insert movable upon said location and having means for supporting dinnerware instead of a cooking vessel when placed upon said location, said rack member being hinged to said one shelf structure and being tiltable from horizontal dinnerware supporting position to an upright position.

8. In a dishwasher according to claim 1, said one shelf structure having a rack-member insert movable upon said location and having means for supporting dinnerware instead of a cooking vessel when placed upon said location, and said one shelf structure having centering means for guiding the placement of a vessel in centered relation to said upwardly directed nozzle means.

References Cited in the file of this patent

UNITED STATES PATENTS

| | | |
|---|---|---|
| 821,250 | Miller | May 22, 1906 |
| 1,446,905 | Kehoe | Feb. 27, 1923 |
| 1,477,903 | Rosenbaum | Dec. 18, 1923 |
| 1,628,818 | Zademach | May 17, 1927 |
| 1,661,602 | Dary | Mar. 6, 1928 |
| 1,954,222 | Olson | Apr. 10, 1934 |
| 1,959,661 | Ellington | May 22, 1934 |
| 2,189,176 | Kendall | Feb. 6, 1940 |
| 2,372,205 | Hertz | Mar. 27, 1945 |
| 2,622,608 | Moore | Dec. 23, 1952 |